United States Patent [19]

Irino

[11] Patent Number: 5,092,747
[45] Date of Patent: Mar. 3, 1992

[54] FLUID COMPRESSING APPARATUS HAVING BEARING GAP

[75] Inventor: Yasumi Irino, Shizuoka, Japan

[73] Assignee: Kabushiki Kaisha Toshiba, Kanagawa, Japan

[21] Appl. No.: 609,433

[22] Filed: Nov. 5, 1990

[30] Foreign Application Priority Data

Nov. 15, 1989 [JP] Japan .................................. 1-294881

[51] Int. Cl.⁵ ............................................. F04B 21/00
[52] U.S. Cl. ...................................... 417/312; 417/902; 417/63
[58] Field of Search ................... 417/410, 902; 418/63, 418/83

[56] References Cited

U.S. PATENT DOCUMENTS 4,973,068 11/1990 Lebeck ............................ 384/625 X

FOREIGN PATENT DOCUMENTS 170784 7/1989 Japan ...................................... 418/63

*Primary Examiner*—Leonard E. Smith
*Attorney, Agent, or Firm*—Philip M. Shaw, Jr.

[57] ABSTRACT

A fluid compressing apparatus includes a casing, a compressing unit disposed in the casing, a motor-drive unit located in the casing for driving the compressing unit, and a bearing unit for rotatably supporting the rotational shaft of the motor-drive unit. The fluid compressing apparatus also includes a refrigerant of HFC-134$a$ ($CH_2FCF_3$) and a prescribed amount of polyglycol, as a lubricating oil, stored in the casing. The bearing unit and the rotational shaft satisfy the following relationship:

$$C2 \leqq 2 \times So$$

wherein $C2$ is a gap between the rotational shaft and the bearing unit in a radial direction, and $So$ is a total surface roughness of the outer surface of the rotational shaft and the inner surface of the bearing unit.

6 Claims, 2 Drawing Sheets

FLUID COMPRESSING APPARATUS HAVING BEARING GAP

BACKGROUND OF THE INVENTION

1. Field of the Invention

The present invention relates, in general, to fluid compressing apparatus. In particular, the invention relates to a fluid compressing apparatus used for a refrigerating apparatus. The fluid compressing apparatus is provided with a lubricating fluid material used for rotatable contacting portions of the fluid compressing mechanism thereof. The lubricating fluid material is stored in the fluid compressing apparatus together with refrigerant.

2. Description of the Related Art

Various types of a fluid compressing apparatus are used for a refrigerating cycle in a household refrigerating system. One common type may be a rotary type fluid compressor. The rotary type fluid compressor typically includes a compressing section and a driving section, i.e., motor, which drives the compressing section arranged in a sealed housing. The middle portion of a rotational shaft extending from the driving section is rotatably supported by a fixed frame mounted on the inner wall of the sealed housing. The extended end portion of the rotational shaft projecting through the fixed frame is connected to the roller of the compressing section, and the roller is rotated in the compressing chamber formed in the fixed frame.

In such a rotary compressor used for a refrigerating apparatus, the CFC-12 refrigerant ($CCL_2F_2$) is used as a fluid to be compressed. The CFC-12 Refrigerant (polyhalide hydrocarbon) is a kind of flon (chlorofluorocarbon). In general, flon is easily liquidized by applying pressure, and has nonflamable and innoxious properties. Thus, such a flon has been widely used as refrigerant, atomizing agent, extinguishing agent. etc. However, specific kinds of flon including chlorine (Cl) rarely decompose in the air because of their chemical stability and have been said to destroy the earth's ozone layer. At the present time, use of such specific kinds Of flon are intended to be globally controlled to avoid destruction of the ozone layer. Thus, the HFC-134a refrigerant ($CH_2FCF_3$) is proposed as a substitute for such specific kinds of flon, e.g., CFC-12 refrigerant. Since the HCF-134a refrigerant has no chlorine (Cl) in its chemical composition, it does not harm the ozone layer.

In view of the mutual solubility of the HCF-134a refrigerant and lubricating oil, use of a synthetic lubricating oil of polyglycol e.g., polyalkyleneglycol, (hereinafter referred to as PG) has been considered when the above-described HFC-134a refrigerant is used as a fluid to be compressed. However, the viscosity-pressure coefficient ($\alpha$) of the PG is less than approximately 50% of that of a generally known mineral oil, e.g., a naphtene system mineral oil. Thus, since the oil film thickness formed by the PG is extremely thin, as compared with that of a naphtene system mineral oil, there is a possibility of a burn-in caused by the rotational contact of metal surfaces of the rotational shaft and its bearing portion if the PG is used in the conventional fluid compressor.

To avoid the above-described problem, it has been suggested that the viscosity of the PG be increased to increase the oil film thickness of the PG between the rotational shaft and its bearing portion. However, an increase in the viscosity of the PG results in an increase in the slide-resistance between the rotational shaft and its bearing portion. In particular, the viscosity of the PG is increased as the external temperature decreases, resulting in an increase in the power consumption.

SUMMARY OF THE INVENTION

Accordingly, it is an object of the present invention to enable a fluid compressor to use the HFC-134a refrigerant as a fluid to be compressed.

It is another object of the invention to adapt the mechanical arrangement of the rotational shaft and its bearing portion of a fluid compressor to the oil film thickness of polyglycol used as a lubricating oil when the HFC-134a refrigerant is used.

To accomplish the above-described objects, a fluid compressing apparatus includes a casing in which refrigerant and a prescribed amount of polyglycol acting as a lubricating oil is stored, a compressing section disposed in the casing for compressing the refrigerant, a motor-drive section having a rotational shaft for driving the compressing section, and a bearing for rotatably supporting the rotational shaft of the motor-drive section, the bearing and the rotational shaft satisfying the following relationship:

$$C2 \leq 2 \times So$$

wherein C2 is a gap between the rotational shaft and the bearing in a radial direction, and So is a total surface roughness of the outer surface of the rotational shaft and the inner surface of the bearing. The refrigerant may be HFC-134a ($CH_2FCF_3$).

BRIEF DESCRIPTION OF THE DRAWINGS

These and other objects and advantages of this invention will become more apparent and more readily appreciated from the following detailed description of the presently preferred embodiment of the invention, read in conjunction with the accompanying drawings wherein.

DETAILED DESCRIPTION OF THE PREFERRED EMBODIMENT

Figure 1:
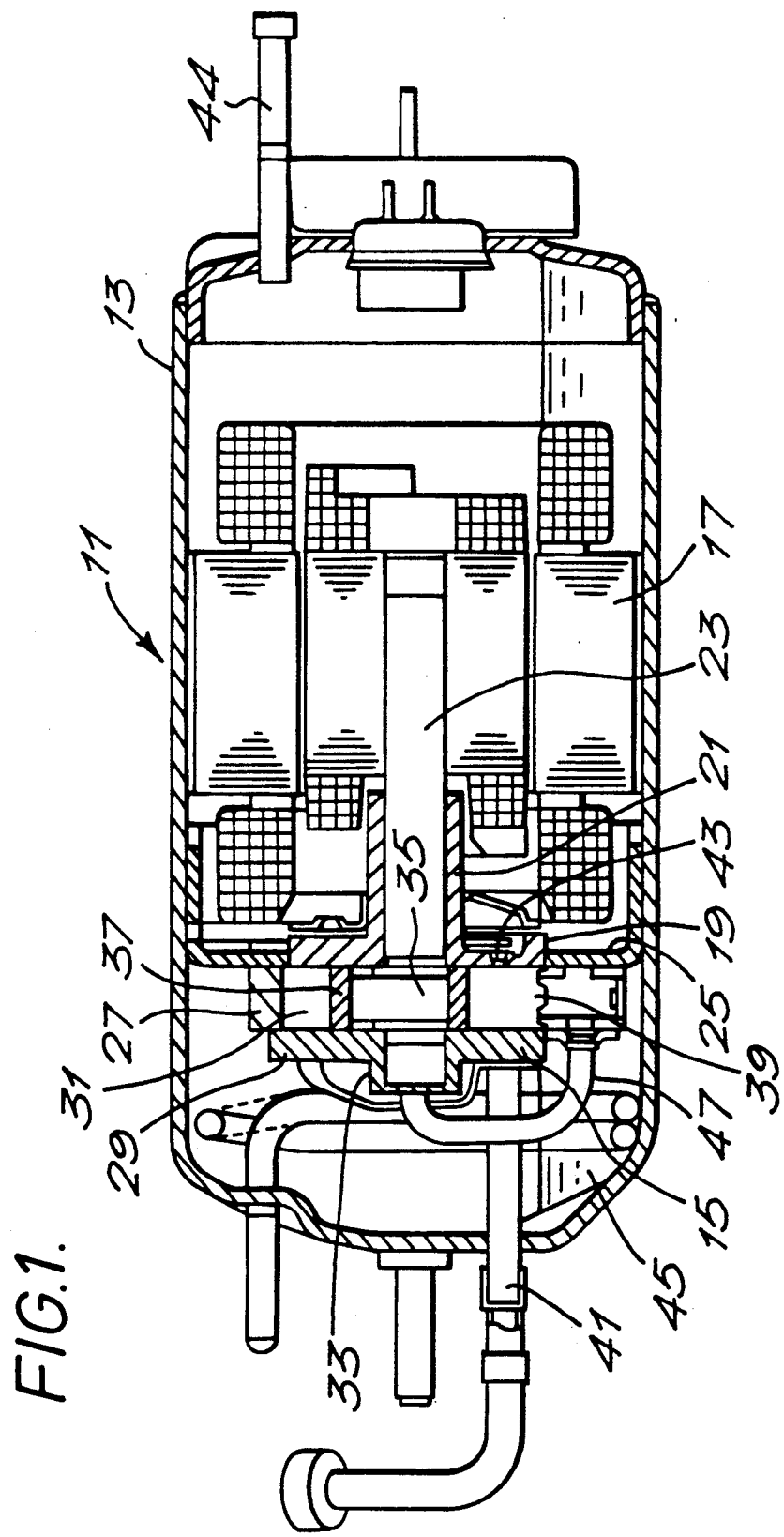
FIG. 1 is a cross sectional view illustrating a rotary compressor of one embodiment of the present invention.

The preferred embodiment of the present invention will now be described with reference to the accompanying drawings. In this embodiment, the present invention is applied to a rotary compressor. As shown in FIG. 1, a rotary compressor 11 includes a cylindrically sealed outer casing 13 laterally installed. A rotary compressing mechanism 15 and a motor-driving mechanism 17 are arranged serially in outer casing 13 in a lateral direction. Rotary compressing mechanism 15 is driven by motor-driving mechanism 17.

Rotary compressing mechanism 15 includes a frame 19 firmly fixed to the circumferential inner wall of outer casing 13. Frame 19 includes a first bearing section 21 to rotatably support the midway portion of a rotational shaft 23 of motor-driving mechanism 17. Frame 19 also includes a ring frame section 25 extending from the outer surface of first bearing section 21 in a radial direction. Ring frame section 25 is formed in an L-shape in section, and the extended outer wall thereof is fixed to the inner wall of outer casing 13 by a weld.

A ring-shaped partition plate 27 is mounted on the front wall of ring frame section 25, and a bearing frame 29 is further mounted on ring-shaped partition plate 27. Thus, a cylinder 31 is formed by frame 19, partition plate 27 and bearing frame 29. Rotational shaft 23 extends into cylinder 31 and the extended end of shaft 23 is rotatably supported by a second bearing section 33 formed at the center portion of bearing frame 29.

A cam 35 is formed at a portion of rotational shaft 23 exposed in cylinder 31. Cam 35 has its center off the rotation center of rotational shaft 23, and a roller 37 is fixed to the outer wall of cam 35. Thus, roller 37 is eccentrically rotated in cylinder 31 in response to the rotation of rotational shaft 23.

A blade 39 is located across cylinder 31 in a radial direction. One end of blade 39 is forcibly in contact with the outer surface of roller 37 by a compressed spring (not shown) disposed at the other end of blade 39. Thus, blade 39 is reciprocally moved in a radial direction in response to the eccentrically rotation of roller 37. Blade 39 partitions the inside of cylinder 31 into two cells (not shown). One of the cells is in communication with a suction pipe 41 connected to cylinder 31. The other cell is in communication with the inside of outer casing 13 through an exhaust opening 43 formed in first bearing section 21 of frame 19. A discharge pipe 44 is connected to a portion of outer casing 13 opposite to the portion to which suction pipe 41 is connected, as shown in FIG. 1. Refrigerant of HFC-134a is compressed in cylinder 31 in response to the operation of roller 37 and blade 39 A known pump device (not shown) is provided at the backside of blade 39 to supply the PG 45 stored in outer casing 13 to second bearing section 33 through a connection pipe 47. The PG supplied to second bearing section 33 is further supplied to first bearing section 21 through an oil pass (not shown) formed in rotational shaft 23 along its axis. The above-described oil compressor. One example of such an oil supplying mechanism is disclosed in U.S. Pat. No. 4,557,677 issued to the same assignee as the present invention, and entitled VALVELESS LUBLICANT PUMP FOR A LATERAL ROTARY COMPRESSOR.

Figure 2:
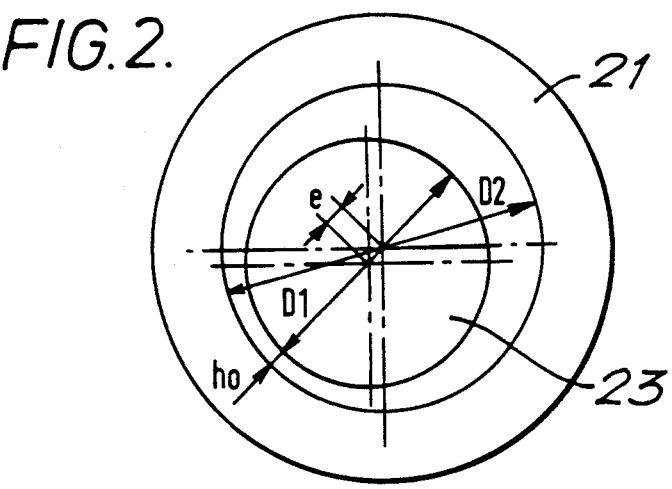
FIG. 2 is an enlarged view illustrating the dimensional relationship between the rotational shaft and its bearing of the rotary compressor shown in FIG. 1.

Referring to FIG. 2, the relationship of rotational shaft 23 and first and second bearing sections 21 and 33 will not be described. A gap C2 defined by rotational shaft 23 and first or second bearing section 21 or 33 in a radial direction is expressed by the following equation:

$$C2 = \tfrac{1}{2} \times (D2 - D1) \qquad (1)$$

wherein the D1 is a diameter of rotational shaft 23, and the D2 is an inner diameter of first or second bearing section 21 or 33. In addition, an eccentric amount between rotational shaft 23 and first or second bearing section 21 or 33 is indicated by the alphabetical symbol e in FIG. 2.

In general, Sommerfeld number S is used as an index indicating the lubricating characteristics between the rotational shaft and the bearing in a journal bearing used for the compressor of a common refrigerator. Sommerfeld number S is expressed by the following equation:

$$S = (r/C)^2 \times \eta \times N/P \qquad (2)$$

wherein r is a radius of the rotational shaft, C is a gap between the rotational shaft and the bearing in a radial direction, $\eta$ is a viscosity of lubricating oil, N is the number of rotations of the rotational shaft per unit time, and P is an average pressure of the bearing.

Accordingly, if each variable of equation (2) is determined so that Sommerfeld numbers S before and after the lubricating oil is changed from the conventional lubricating oil to the PG are equal, a minimum oil film thickness ho between the shaft and the bearing shown in FIG. 2 is maintained at the same condition even if the lubricating oil is changed. Thus, for a Sommerfeld number S, the minimum oil film thickness ho and the gap C have a following relationship:

$$S \propto ho/C. \qquad (3)$$

In accordance with equation (2), if the kind of lubricating oil is changed in a compressor, and the compressor is operated at the same conditions (i.e., number of rotations N of the rotational shaft per unit time and an average pressure P of the bearing) that it was operated at before the lubricating oil was changed, each Sommerfeld number S before and after the lubricating oil is changed is expressed by the following equations.

$$S1 = (r/C1)^2 \times \eta 1 \times N/P \qquad (4)$$

$$S2 = (r/C2)^2 \times \eta 2 \times N/P \qquad (5)$$

Equation (4) indicates the Sommerfeld number before the lubricating oil is changed, and equation (5) indicates the Sommerfeld number after the lubricating oil is changed to the PG.

Since each Sommerfeld number S1, S2 should be equal to one another to maintain the minimum oil film thickness ho at the same value before and after the lubricating oil is changed, the following relationship is derived from equations (4) and (5).

$$(1/C1)^2 \times \eta 1 = (1/C2)^2 \times 2. \qquad (6)$$

According to equation (6), since the viscosity-pressure coefficient of the PG is about 50% of that of the conventional mineral oil, i.e., $1/\eta 2 = 2$, a suitable value of gap C2 between the rotational shaft and the bearing in a radial direction can be obtained by multiplying C1 by 0.7.

Figure 3:
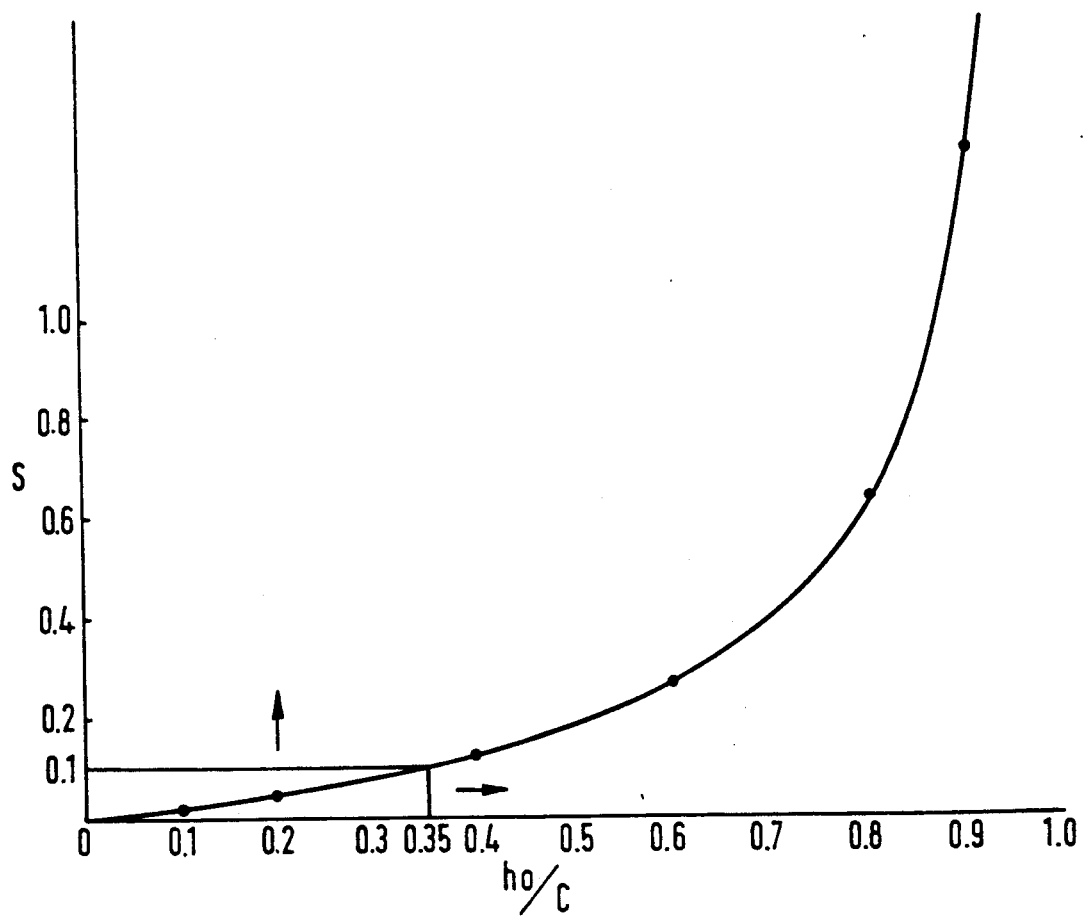
FIG. 3 is a graph illustrating the relationship between a ratio of the minimum thickness (ho) of an oil film to a gap (C) between the rotational shaft and its bearing and Sommerfeld number (S) of a common mineral oil when a 360° journal bearing whose length and diameter are the same as each other is used.

In general, the Sommerfeld number S is equal to or greater than 0.1 in a compressor which uses a conventional mineral oil or a paraffin system oil, as a lubricating oil. Thus, the following relationship is derived from FIG. 3 when a 360° journal bearing is used:

$$ho/C1 \geq 0.35. \qquad (7)$$

In addition, at least the following relationship should be satisfied to ensure smooth lubrication between the rotational shaft and the bearing:

$$ho = SS + SB = So \qquad (8)$$

wherein SS is a surface roughness of the shaft, SB is a surface roughness of the bearing and So is a total surface roughness of the bearing and the shaft.

Then, the following relationship is derived from the above-described relationships (7) and (8):

$$C1 \leq So / 0.35. \tag{9}$$

As described above, since C2 is substantially equal to the value (0.7×C1), the following relationship is also obtained:

$$C2 = 0.7 \times C1 < 0.7 \times So / 0.35. \tag{10}$$

Thus, the following relationship is finally obtained:

$$C2 \leq 2 \times So \tag{11}$$

As can be understood from the above-described relationship (11), a sufficient lubricating condition can be achieved if the above-described relationship (11) is satisfied when the PG is used as a lubricating oil.

It should be noted that the above-described surface roughness is expressed by the ten point average roughness (Rz) provided in ISO (International Standardization Organization) R 468-1966.

In the above-described embodiment, the fluid compressing apparatus can use the HFC-134a refrigerant together with the PG instead of the conventional HCFC-22 refrigerant if the gap C2 defined by the notational shaft and the bearing in a radial direction and the total surface roughness So of each surface roughness of the shaft and the bearing satisfy the above-described relationship (11). Thus, a burn-in caused by the rotational con&act of metal surfaces of the rotational shaft and the bearing portion can be avoided.

In the above-described embodiment, the present invention is applied to a rotary compressor. However, the present invention may be applied to other types of fluid compressing apparatus, e.g., a scroll type, a reciprocating type, etc., wherein the compressing and the motor-drive sections are located in the casing and a prescribed amount of lubricating oil is also provided in the casing.

The present invention has been described with respect to a specific embodiment. However, other embodiments based on the principles of the present invention should be obvious to those of ordinary skill in the art. Such embodiments are intended to be covered by the claims.

What is claimed is:

1. A fluid compressing apparatus comprising:
   a casing;
   a prescribed amount of polyglycol stored in the casing, as a lubricating oil;
   compressing unit disposed in the casing;
   motor-drive unit for driving the compressing unit, the motor-drive unit having a rotational shaft of a first surface roughness connected to the compressing unit; and
   bearing means having an inner surface of a second surface roughness for rotatably supporting the rotational shaft, the bearing means and the rotational shaft satisfying the following relationship:

$$C2 \leq 2 \times So$$

wherein C2 is a gap between the rotational shaft and the bearing means in a radial direction, and So is a total surface roughness of the outer surface of the rotational shaft and the inner surface of the bearing means.

2. An apparatus according to claim I further including refrigerant stored in the casing.

3. An apparatus according to claim 2, wherein the refrigerant is HFC-134a ($CH_2FCF_3$)

4. An apparatus according to claim 3 further including means for supplying polyglycol to the bearing means.

5. An apparatus according to claim 4 further including a suction pipe communicated with the compressing unit to supply refrigerant from the outside of the casing to the compressing unit.

6. An apparatus according to claim 5 further including a discharge pipe connected to the casing to discharge refrigerant from the compressing unit to the outside of the casing.

* * * * *